US012618769B2

(12) United States Patent
Thabeth et al.

(10) Patent No.: US 12,618,769 B2
(45) Date of Patent: May 5, 2026

(54) SELF-CLEANING OPTICAL PROBE

(71) Applicant: Inov8 Systems Limited, Belfast (GB)

(72) Inventors: Khalid Thabeth, Belfast (GB);
Raymond Acheson, Belfast (GB)

(73) Assignee: Inov8 Systems Limited, Belfast (GB)

( * ) Notice: Subject to any disclaimer, the term of this patent is extended or adjusted under 35 U.S.C. 154(b) by 273 days.

(21) Appl. No.: 18/309,301

(22) Filed: Apr. 28, 2023

(65) Prior Publication Data

US 2023/0349815 A1 Nov. 2, 2023

(30) Foreign Application Priority Data

May 1, 2022 (GB) ...................................... 2206373

(51) Int. Cl.
G01N 21/15 (2006.01)
G01N 29/28 (2006.01)
(Continued)

(52) U.S. Cl.
CPC ....... G01N 21/15 (2013.01); G01N 2021/154 (2013.01); G01N 29/28 (2013.01);
(Continued)

(58) Field of Classification Search
CPC .. G01N 21/15; G01N 2021/154; G01N 29/28; G01N 2291/0421; G01N 2291/044; G10K 11/004; G01S 7/521
(Continued)

(56) References Cited

U.S. PATENT DOCUMENTS 5,842,995 A * 12/1998 Mahadevan-Jansen .....................
A61B 5/4331
600/476
7,935,938 B2 * 5/2011 Thabeth ................. G01N 21/85
250/458.1
(Continued)

FOREIGN PATENT DOCUMENTS

CA 2897355 A1 * 7/2014 .............. B08B 3/12
CN 204086120 1/2015
(Continued)

OTHER PUBLICATIONS

Won et al., Detection and Evaluation Technique of Hydrogen Attack, Journal of the Korean Society for Nondestructive Testing vol. 22, No. 1 , 2002, pp. 32-37 (Year: 2002).*
(Continued)

*Primary Examiner* — Stephanie E Bloss
*Assistant Examiner* — Kevin C Butler
(74) *Attorney, Agent, or Firm* — Gardner, Linn, Burkhart & Ondersma LLP

(57) ABSTRACT
An optical probe includes an elongate hollow probe body, an optical window mounted at a distal end of the probe body for transmitting light therethrough, an ultrasonic transducer mounted within the probe body for applying ultrasonic vibrations to the optical window for cleaning the optical window, and one or more light guides located within the probe body for transmitting light through the optical window to a measurement region and/or for receiving light transmitted through the optical window from the measurement region. The ultrasonic transducer is located within the distal end of the probe body adjacent the optical window to transmit ultrasonic vibrations directly from the ultrasonic transducer to the window.

11 Claims, 2 Drawing Sheets

(51) Int. Cl.
  *G01S 7/521* (2006.01)
  *G10K 11/00* (2006.01)
(52) U.S. Cl.
  CPC ................ *G01N 2291/0421* (2013.01); *G01N 2291/044* (2013.01); *G01S 7/521* (2013.01); *G10K 11/004* (2013.01)
(58) Field of Classification Search
  USPC ......................................................... 73/632
  See application file for complete search history.

(56) References Cited

U.S. PATENT DOCUMENTS

| | | | | |
|---|---|---|---|---|
| 10,393,660 | B2 * | 8/2019 | Zhang | G02B 5/20 |
| 2002/0167664 | A1 * | 11/2002 | Rettig | G01N 21/15 356/338 |
| 2005/0219541 | A1 * | 10/2005 | Johnson | G01N 21/8507 356/436 |
| 2008/0030714 | A1 * | 2/2008 | Hall | B08B 17/02 356/73.1 |
| 2008/0212087 | A1 * | 9/2008 | Mannhardt | G01N 21/8507 356/244 |
| 2009/0023733 | A1 * | 1/2009 | Cage | A61P 11/06 514/249 |
| 2009/0253964 | A1 * | 10/2009 | Miyamoto | G02B 23/2476 600/157 |
| 2009/0264701 | A1 | 10/2009 | Ito | |
| 2011/0259378 | A1 * | 10/2011 | Skeidsvoll | B08B 3/12 134/184 |
| 2011/0313253 | A1 * | 12/2011 | Ito | A61B 1/00091 600/175 |
| 2012/0255361 | A1 * | 10/2012 | Thabeth | G01N 21/15 73/655 |
| 2015/0260639 | A1 | 9/2015 | Thabeth et al. | |
| 2015/0285733 | A1 * | 10/2015 | Henriksen | B08B 7/028 134/1 |
| 2016/0025617 | A1 * | 1/2016 | Magnussen | G01N 21/15 356/213 |
| 2018/0128746 | A1 * | 5/2018 | Zhang | G01N 21/51 |
| 2020/0086346 | A1 * | 3/2020 | Kobrin | H10N 30/706 |
| 2022/0099563 | A1 * | 3/2022 | Thabeth | G01N 33/1833 |
| 2023/0349815 | A1 * | 11/2023 | Thabeth | G01N 21/8507 |

FOREIGN PATENT DOCUMENTS

| | | | | | |
|---|---|---|---|---|---|
| EP | 1256793 | A1 * | 11/2002 | | G01N 21/15 |
| GB | 2580699 | A * | 7/2020 | | B08B 3/12 |
| JP | H101320449 | | 12/1989 | | |
| JP | 5-329156 | | 12/1993 | | |
| JP | 5129004 | B2 * | 1/2013 | | A61B 1/00091 |
| JP | 5485041 | B2 * | 5/2014 | | A61B 1/00091 |
| JP | 5842995 | B2 * | 1/2016 | | C08G 59/063 |
| NO | 20130103 | A1 * | 7/2014 | | G01N 21/15 |
| WO | 2008015390 | | 2/2008 | | |
| WO | WO-2008015390 | A1 * | 2/2008 | | B08B 3/12 |
| WO | 2009/134145 | | 11/2009 | | |
| WO | 2011047813 | | 4/2011 | | |
| WO | WO-2011047813 | A1 * | 4/2011 | | B08B 7/028 |

OTHER PUBLICATIONS

Kromine et al., Detection of subsurface defects using laser based technique, AIP Conference Proc. https://doi.org/10.1063/1.1373946, 557, 1612-1617 (2001) (Year: 2001).*

UK Search Report of corresponding UK Application No. GB2206373.9, dated Oct. 12, 2022.

* cited by examiner

SELF-CLEANING OPTICAL PROBE

CROSS REFERENCE TO RELATED APPLICATION

The present application claims priority benefit of U.K. Pat. Application Ser. No. GB2206373.9, filed May 1, 2022, which is hereby incorporated herein by reference in its entirety.

FIELD OF THE INVENTION

This invention relates to a self-cleaning optical probe and in particular to a self-cleaning optical probe for use in a high pressure medium.

BACKGROUND OF THE INVENTION

There are many applications that require measurement of the quantity of oil and/or the identification of oil or other contaminants present in a liquid. For example, in pipes leading from oil production or refining facilities or the like it may be required to measure the amount of oil and/or the identity of oil present in the liquid (mainly water) flowing in the pipes. Oil in water analysers or probes are used for this purpose, either in side stream passages or as insertion probes. Oil has a natural fluorescence. Therefore oil in water analysers typically measure the quantity of oil present in water by the detection of fluorescence. Devices that detect and/or measure fluorescence are commonly referred to as fluorometers. A fluorometer usually includes a light source for causing fluorescence in a target substance and a detector for measuring the resultant fluorescence.

A typical oil in water analyser has a measurement window located at a distal end of an elongate probe body through which the excitation light source is transmitted into the measurement region and through which the resultant fluorescent and/or reflected light is received to be analysed in order to determine the quantity and/or identify of oil and/or other contaminants present. Fouling of the measurement window by oil and other substances will occur without means for cleaning the measurement window. This problem may be addressed by using an ultrasonic transducer, typically located an inner end of the probe body, opposite the distal end, whereby the measurement window can be cleaned by ultrasonic cavitation created by the ultrasonic energy transmitted to the measurement window from the ultrasonic transducer through the probe body.

A known optical probe of an oil in water analyser, as illustrated in FIG. 1, includes an elongate hollow probe shaft 2 (known as a sonitrode) having a sapphire window 4 (defining the measurement window) at a distal end thereof. An ultrasonic transducer 6 having ceramic transducer discs is mounted on an opposite end of the probe shaft 2 for transmitting ultrasonic energy 5 to the window 4 via the probe shaft 2.

Optical fibres and electrical leads are typically passed through a central channel 8 of the hollow probe shaft 2, typically via an entry slot cut through side of the probe shaft or through a hollow bolt securing a back mass of the ultrasonic transducer 6 to the transducer discs.

The central channel 8 through the hollowed probe in itself introduces large inefficiencies in the transmission of ultrasonic energy. The probe is typically provided with a mounting flange 9 welded to the outer periphery of the probe shaft 2 adjacent a rear end of the probe shaft 2. On a conventional ultrasonic probe the position of the ultrasonic transducer 6 at the rear of the probe, transmitting ultrasonic waves down the full length of the probe shaft 2, applies physical stress directly to the mounting flange welds. This can result in fracture of the welded joint. To try and mitigate this problem the mounting flange may be positioned at a low ultrasonic energy point. However, the flange position is primarily dictated by the probe penetration depth. If the mounting flange is not positioned at a low energy point on the body of the probe, it will not only cause stress to the flange weld, it may greatly impact the efficient transmission of ultrasonic energy to the front of the probe and the optical window. The loss of transmission energy in this arrangement limits the effective cleaning capability to applications where the medium pressure is low, typically less than 10 Bar.

SUMMARY OF THE INVENTION

According to the present invention there is provided an optical probe comprising an elongate hollow probe body, an optical window mounted at a distal end of the probe body for transmitting light therethrough, an ultrasonic transducer mounted within the probe body for applying ultrasonic vibrations to the optical window for cleaning the optical window, and one or more light guides located within the probe body for transmitting light through the optical window to a measurement region and/or for receiving light transmitted through the optical window from the measurement region, wherein the ultrasonic transducer is located within the distal end of the probe body adjacent the optical window to transmit ultrasonic vibrations directly from the ultrasonic transducer to the window.

Optionally, the ultrasonic transducer is located within the probe body via a mounting flange extending between the body of the ultrasonic transducer and an inner wall of the probe body, the mounting flange being located at a zero point of the ultrasonic transducer.

The optical window may be mounted on a distal end of the ultrasonic transducer within an opening in the distal end of the probe body. A resilient seal may be provided between the optical window and the opening in the distal end of the probe body.

Optionally, the one or more light guides are provided within the probe body to cooperate with the optical window, the one or more light guides extending between the ultrasonic transducer and an inner wall of the probe body. The one or more light guides may extend through the mounting flange.

The ultrasonic transducer may include one or more ceramic transducer elements and a reaction mass mounted against the one or more ceramic transducer elements at a rear end of the transducer, and a transducer shaft extending between the one or more ceramic transducer elements and the optical window. The transducer elements and reaction mass may be secured to the transducer shaft by means of a fastener passing therethrough. A distal end of the transducer shaft may have a diameter less than the diameter of the optical window such that the transducer shaft cooperates with a central region of the optical window to transmit ultrasonic vibrations thereto. The one or more light guides may cooperate with a peripheral region of the optical window outside of the central region of the optical window.

The transducer shaft of the ultrasonic transducer may be a solid shaft whereby ultrasonic energy is transmitted therethrough with minimum energy loss.

The one or more light guides may be made up of one or more optical fibres, for example.

These and other objects, advantages, purposes and features of the present invention will become apparent upon review of the following specification in conjunction with the drawings.

BRIEF DESCRIPTION OF THE DRAWINGS

An embodiment of the present invention will now be illustrated, by way of example, with reference to the accompanying drawing, in which:—

DETAILED DESCRIPTION OF THE DRAWINGS

Figure 1:
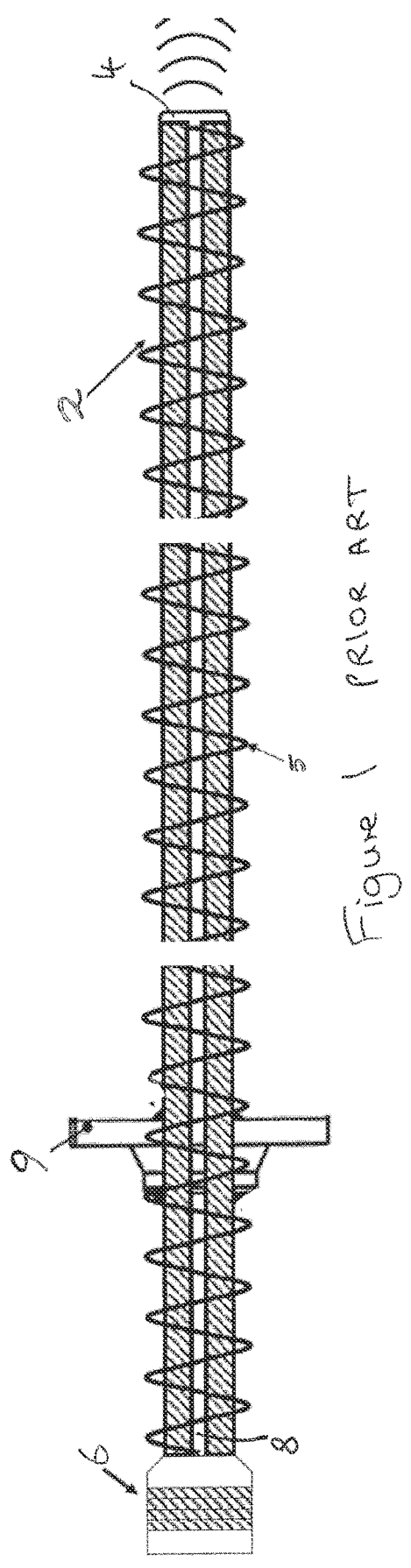
FIG. 1 is a longitudinal sectional view through a prior art optical probe.
Figure 2:
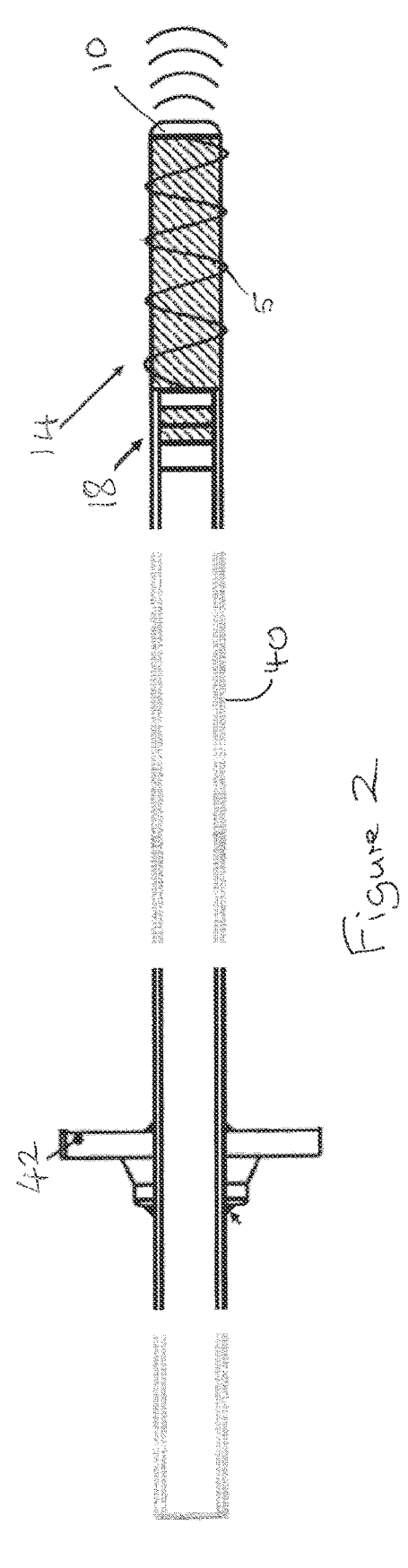
FIG. 2 is a longitudinal sectional view through an optical probe in accordance with an embodiment of the present invention.
Figure 3:
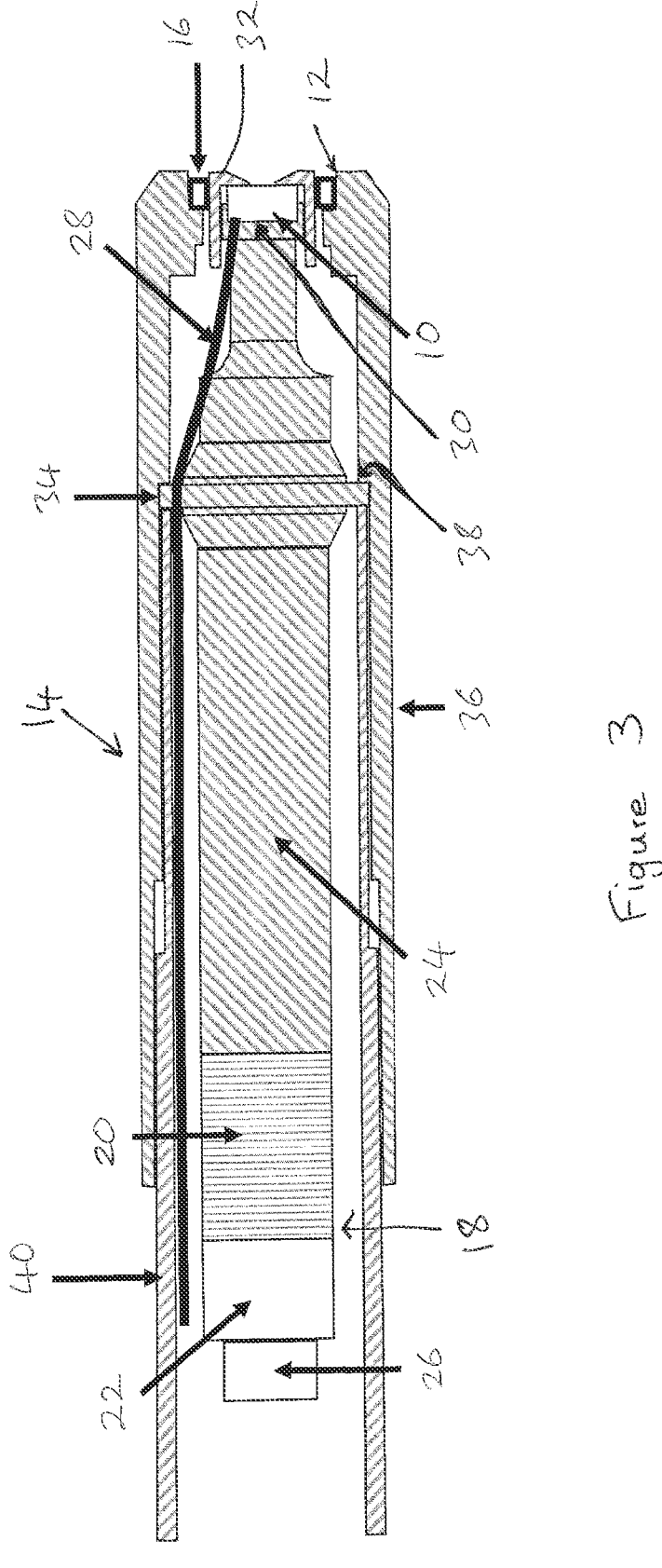
FIG. 3 is a detailed sectional view through the front end of the optical probe of FIG. 2.

As illustrated in FIGS. 2 and 3, an optical probe in accordance with an embodiment of the present invention includes a measurement window 10, defining a distal end of an insertion probe, the measurement window being mounted in an opening 12 in a distal end of a hollow elongate probe body 14. A resilient seal 16 is provided in the opening in the probe body 14 around the periphery of the measurement window 10.

As best shown in FIG. 3, an ultrasonic transducer 18 is provided within the hollow probe body 14 adjacent the measurement window 10 for transmitting ultrasonic energy 5 to the measurement window 10 in order to clean the window 10. The ultrasonic transducer 18 may include one or more ceramic transducer discs 20 located between a back mass 22 and a transducer shaft 24. A bolt 26 preferably passes through the rear of the back mass 22 and through the ceramic transducer discs 20 into the rear end of the transducer shaft 24 to secure the ceramic discs 20 and back mass 22 to the transducer shaft 24.

A distal end of the transducer shaft 24 of the ultrasonic transducer 18 is mechanically coupled to the measurement window 10 to directly transit ultrasonic energy from the transducer shaft 24 to the measurement window 10. As such, the measurement window 10 receives ultrasonic energy directly from the transducer 18 without the losses inherent in prior art arrangements wherein a hollow probe body 14 is disposed between the ultrasonic transducer 18 and the measurement window 10. Furthermore, the location of the measurement window 10 within the opening 12 in a distal end of the probe body 14, without direct mechanical coupling between the probe body 14 and the measurement window 10 further avoids the losses of ultrasonic energy inherent in prior art arrangements wherein the measurement window is mechanically coupled to the probe body 14. The resilient seal 16 seals the distal end of the probe body 14 while mechanically isolating the measurement window 10 from the probe body 14.

Light guides 28 (only one shown in FIG. 3), such as in the form of optical fibres, extend alongside the transducer shaft 24, distal ends of light guides 28 being mounted in an intermediate plate 30, secured between the transducer shaft 24 and measurement window 10, whereby the light guides 28 are located adjacent and alongside a distal end of the transducer shaft 24 to transmit and received light through the measurement window 10.

The measurement window 10 is secured to the intermediate plate 30 via a cap 32 extending over the measurement window 10 and having an opening for the passage of light into and out of the window 10, the seal acting between the opening 12 in the distal end of the probe body 14 and the outer sides of the cap 32.

The solid cylindrical transducer shaft 24 extending between the ceramic transducer discs 20 and the measurement window 10 and the location of the ultrasonic transducer 18 within the front end of the probe body 14 directly adjacent and in contact with the measurement window 10 minimises any loss of energy between the two and therefore greatly reduces the energy consumption of the ultrasonic transducer 18 required for the creation of cavitation and efficient cleaning of the measurement window 10.

Furthermore, the location of the light guides 28 to the side of the transducer shaft 24, and therefore to a side region of the window 10 advantageously increases the useful life of the measurement window 10. This is because ultrasonic energy from the ultrasonic transducer 18 is highest in a central region of the measurement window 10 (i.e. along the central axis of the transducer shaft 24), reducing towards the outer edges of the window 10. Therefore cavitation is greatest in this central region, leading to erosion and etching of this central region of the window 10.

The transducer shaft 24 of the ultrasonic transducer 18 is located within the hollow probe body 14 by means of a transducer mounting flange 34 affixed (for example by welds) to the transducer shaft 24 and extending between the transducer shaft 24 of the ultrasonic transducer 18 and the probe body 14. As shown in FIG. 3, the probe body 14 includes a distal portion 36 having the opening 12 at a distal end thereof within which the measurement window 10 is located, the mounting flange 34 of the ultrasonic transducer abutting a stepped seat 38 within the distal portion 36 of the probe body 14, the remainder of the probe body 14 including a tubular portion 40 having a distal end inserted within the distal end of the distal portion 36 and engaging the mounting flange 34 of the ultrasonic transducer 18 to secure the ultrasonic transducer 18 (and the window 10) within the probe body 14. The distal end of the tubular portion 40 of the probe body 14 may be threadedly engaged within the distal portion 36 of the probe body 14.

The transducer mounting flange 34 is located at a zero point of the ultrasonic transducer 18 (i.e. minimum point of ultrasonic energy) such that the probe body 14 is isolated from the ultrasonic vibrations generated by the ultrasonic transducer 18, preventing ultrasonic energy from being absorbed by the probe body 14.

The isolation of the probe body 14 from the ultrasonic transducer 18 and the direct coupling between the ultrasonic transducer 18 and the measurement window 10 avoids the losses in ultrasonic energy inherent in prior art optical probes. Furthermore, it allows the length of the probe body 14 and the position of a probe mounting flange 42 on the probe body 14 to be readily varied without requiring calibration of the position of the mounting flange 42 and length of the probe body 14, unlike prior art examples wherein the mounting flange location needs to be aligned with a zero point of the ultrasonic vibrations to try and avoid losses of ultrasonic energy and fracture of the mounting flange welds.

Because the ultrasonic transducer 18 is located at the front end of the probe body 14, isolating the ultrasonic waves from the probe body, the prior art problem of stressing of welds along the probe body, particularly at the mounting flange 42, is avoided and the location of a mounting flange on the probe body is not critical. In turn, vast improvement in transmission efficiency is achieved, reducing the power required (by as much as 85%) to achieve the desired effect of cleaning the optical window and allowing effective cleaning of the window in high pressure mediums (for example in excess of 80 Bar. Furthermore, because the probe body 14 does not have to transmit ultrasonic energy it can be made of lighter construction, allowing a significant reduction in the overall weight of the probe, further reducing stress on the welds of the mounting flange.

The invention is not limited to the embodiments described herein but can be amended or modified without departing from the scope of the present invention, which is intended to be limited only by the scope of the appended claims as interpreted according to the principles of patent law including the doctrine of equivalents.

The invention claimed is:

1. An optical probe for use in a high pressure medium, said optical probe comprising:
    an elongate hollow probe body having an inner wall;
    an optical window mounted at a distal end of said probe body for transmitting light therethrough;
    an ultrasonic transducer mounted within said probe body for applying ultrasonic vibrations to said optical window for cleaning said optical window, said ultrasonic transducer having an ultrasonic transducer body;
    one or more light guides located within said probe body for transmitting light through said optical window to a measurement region and/or for receiving light transmitted through said optical window from said measurement region; and
    a mounting flange extending between said ultrasonic transducer body and said inner wall of said probe body, said mounting flange being located at a zero point of said ultrasonic transducer;
    wherein said ultrasonic transducer is located within said distal end of said probe body via said mounting flange, adjacent said optical window, and is operable to transmit ultrasonic vibrations directly from said ultrasonic transducer to said window.

2. The optical probe of claim 1, wherein said optical window is mounted on a distal end of said ultrasonic transducer within an opening in said distal end of said probe body.

3. The optical probe of claim 2, wherein a seal is provided between said optical window and said opening in said distal end of said probe body.

4. The optical probe of claim 1, wherein said one or more light guides are provided within said probe body to cooperate with said optical window, said one or more light guides extending between said ultrasonic transducer and said inner wall of said probe body.

5. The optical probe of claim 4, wherein said one or more light guides extend through said mounting flange.

6. The optical probe of claim 1, wherein said ultrasonic transducer comprises one or more ceramic transducer elements and a reaction mass mounted against said one or more ceramic transducer elements at a rear end of said ultrasonic transducer, and a transducer shaft extending between said one or more ceramic transducer elements and said optical window.

7. The optical probe of claim 6, wherein said transducer elements and reaction mass are secured to said transducer shaft by a fastener passing therethrough.

8. The optical probe of claim 6, wherein a distal end of said transducer shaft has a diameter less than the diameter of said optical window such that said transducer shaft cooperates with a central region of said optical window to transmit ultrasonic vibrations thereto.

9. The optical probe of claim 8, wherein said one or more light guides cooperate with a peripheral region of said optical window outside of said central region of said optical window.

10. The optical probe of claim 6, wherein said transducer shaft comprises a solid shaft whereby ultrasonic energy is transmitted therethrough with minimum energy loss.

11. The optical probe of claim 1, wherein said one or more light guides comprise one or more optical fibres.

* * * * *